(12) United States Patent  
Kim

(10) Patent No.: US 7,167,716 B2  
(45) Date of Patent: Jan. 23, 2007

(54) SYNCHRONOUS DEMODULATION APPARATUS OF BASE TRANSCEIVER STATION IN INTERIM STANDARD-2000 SYSTEM

(75) Inventor: Jin-Il Kim, Kyoungki-do (KR)

(73) Assignee: Curitel Communications, Inc. (KR)

( * ) Notice: Subject to any disclaimer, the term of this patent is extended or adjusted under 35 U.S.C. 154(b) by 512 days.

(21) Appl. No.: 10/330,737

(22) Filed: Dec. 27, 2002

(65) Prior Publication Data

US 2003/0152172 A1    Aug. 14, 2003

(30) Foreign Application Priority Data

Feb. 8, 2002   (KR)   ................... 2002-7474

(51) Int. Cl.
*H04B 15/00*   (2006.01)
*H04B 7/05*    (2006.01)
*H04B 7/01*    (2006.01)
*H04B 7/015*   (2006.01)

(52) U.S. Cl. ............... 455/502; 455/295; 455/296; 455/303; 455/304; 455/561; 370/203; 370/319; 370/335; 370/342; 375/144; 375/148; 375/316; 375/346

(58) Field of Classification Search .......... 455/295, 455/296, 303, 304, 502, 561; 370/203, 319, 370/335, 342; 375/144, 148, 240.01, 240.29, 375/316, 346
See application file for complete search history.

(56) References Cited

U.S. PATENT DOCUMENTS

| | | | |
|---|---|---|---|
| 5,799,010 A * | 8/1998 | Lomp et al. | 370/335 |
| 6,081,516 A | 6/2000 | Yoshida et al. | |
| 6,792,034 B1 * | 9/2004 | Lee et al. | 375/148 |
| 2002/0044537 A1 * | 4/2002 | Cooper et al. | 370/248 |

FOREIGN PATENT DOCUMENTS

| | | |
|---|---|---|
| EP | 0784385 A1 | 7/1997 |
| EP | 0823796 A2 | 2/1998 |
| EP | 0954112 A2 | 11/1999 |

* cited by examiner

*Primary Examiner*—Nay Maung
*Assistant Examiner*—Tuan H. Nguyen
(74) *Attorney, Agent, or Firm*—Blakely Sokoloff Taylor & Zafman

(57) ABSTRACT

The present invention provides a synchronous demodulation apparatus of a base transceiver station in an Interim Standard-2000 (IS-2000) system, including a first synchronous demodulation unit, a received signal delay unit, an interference signal regeneration unit and a second synchronous demodulation unit. In comparison with an asynchronous demodulation apparatus used in an Interim Standard-95 (IS-95), it is possible for the inventive apparatus to improve a reception function approximately 3dB and ultimately increase the number of subscribers.

3 Claims, 2 Drawing Sheets

Figure 1:
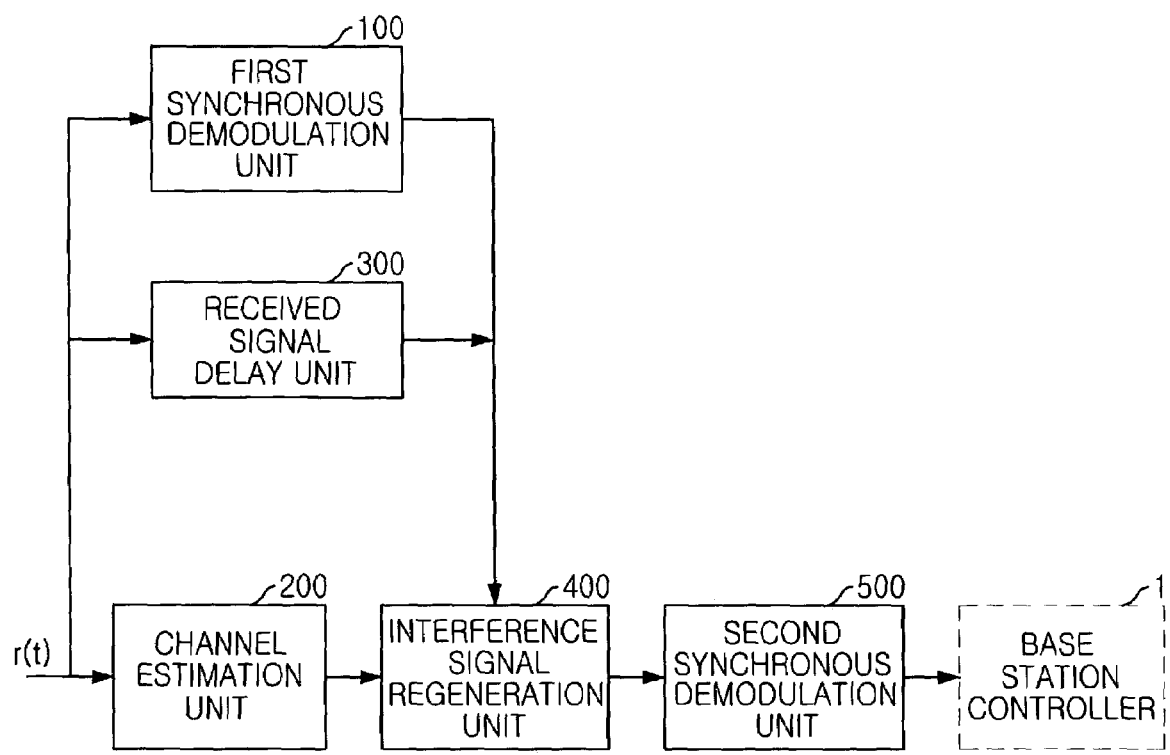

SYNCHRONOUS DEMODULATION APPARATUS OF BASE TRANSCEIVER STATION IN INTERIM STANDARD-2000 SYSTEM

FIELD OF THE INVENTION

The present invention relates to a synchronous demodulation apparatus of a base transceiver station in an Interim Standard-2000 (IS-2000) system; and, more particularly, to a synchronous demodulation apparatus in an IS-2000 system to which a parallel interference cancellation and a consecutive interference cancellation of a Code Division Multiple Access (CDMA) system are applied so as to improve a reception performance of the synchronous demodulation apparatus.

DESCRIPTION OF RELATED ARTS

Among various interference cancellation techniques of a typical Code Division Multiple Access (CDMA) system, a parallel interference cancellation technique and a consecutive interference cancellation have been representatively suggested. However, these suggested cancellation techniques are not applicable to an existing Interim Standard-95 (IS-95) because the IS-95 system does not allow a pilot channel to be transmitted due to high power consumption when a mobile station transmits a radio frequency (RF) signal to a base transceiver station. Since the pilot channel is not used in the reverse system, the typical IS-95 system uses an asynchronous demodulation technique instead of a synchronous demodulation technique which requires to be informed of an amplitude and a phase of a channel.

If the asynchronous demodulation technique of the typical IS-95 system is employed to a currently developing Interim Standard-2000 (IS-2000), the asynchronous demodulation, compared to the synchronous demodulation, is functionally dropped approximately 3 dB in a reception level, thereby preventing the number of subscribers from being increased. Also, in the IS-2000 system, the pilot channel signal is used in the reserve channel. Therefore, a synchronous demodulation apparatus of the IS-2000 system is necessary to increase the reception performance.

SUMMARY OF THE INVENTION

It is, therefore, an object of the present invention to provide a synchronous demodulation apparatus of a base transceiver station used in an Interim Standard-2000 (IS-2000) system to improve a reception performance function and increase the number of subscribers.

In accordance with an aspect of the present invention, there is provided a synchronous demodulation apparatus of a base transceiver station in an Interim Standard-2000 (IS-2000) system, comprising: a first synchronous demodulation unit for receiving received signals r(t) each of which includes a pilot channel signal and a traffic channel signal, demodulating the received signals r(t) to generate -demodulated signals $(d'_1, \ldots, d'_k)$ which corresponds to 'k' numbers of mobile stations, and outputting the demodulated user signals; a channel estimation unit for estimating channel parameters $(A_1(t-T_b), \ldots, A_k(t-T_b))$ for each of the mobile stations based on the pilot channel signals transmitted from the mobile stations, and generating estimated channel parameters; a received signal delay unit for delaying the received signal r(t) and outputting a delayed signal $r(t-T_b)$ which is delayed in one symbol $(T_b)$ from the received signal r(t); an interference signal regeneration unit for generating interference signals corresponding to 'k' numbers of subscribers based on the demodulated user signals $(d'_1, \ldots, d'_k)$ and the estimated channel parameters, removing interference signals corresponding to the 'k' numbers of the subscribers from the delayed signals $r(t-T_b)$, and outputting interference-cancelled-signals $(r'_1(t-T_b), \ldots, r'_k(t-T_b))$ in which the interference signals are removed; and a second synchronous demodulation unit for demodulating the interference-cancelled-signals $(r'_1(t-T_b), \ldots, r'_k(t-T_b))$ and outputting demodulated signals.

In accordance with another aspect of the present invention, there is provided a synchronous demodulation method applied to a base transceiver station in an Interim Standard-2000 (IS-2000) system, the method comprising the steps of: a) receiving received signals r(t) each of which includes a pilot channel signal and a traffic channel signal, demodulating the received signals r(t) to generate demodulated signals $(d'_1, \ldots, d'_k)$ which corresponds to 'k' numbers of mobile stations, and outputting the demodulated user signals; b) estimating channel parameters $(A_1(t-T_b), \ldots, A_k(t-T_b))$ for each of the mobile stations based on the pilot channel signals transmitted from the mobile stations, and generating estimated channel parameters; c) delaying the received signal r(t) and outputting a delayed signal $r(t-T_b)$ which is delayed in one symbol $(T_b)$ from the received signal r(t); d) generating interference signals corresponding to 'k' numbers of subscribers based on the demodulated user signals $(d'_1, \ldots, d'_k)$ and the estimated channel parameters, removing interference signals corresponding to the 'k' numbers of the subscribers from the delayed signals $r(t-T_b)$, and outputting interference-cancelled-signals $(r'_1(t-T_b), \ldots, r'_k(t-T_b))$ in which the interference signals are removed; and e) demodulating the interference-cancelled-signals $(r'_1(t-T_b), \ldots, r'_k(t-T_b))$ and outputting demodulated signals.

BRIEF DESCRIPTION OF THE DRAWING(S)

Figure 2:
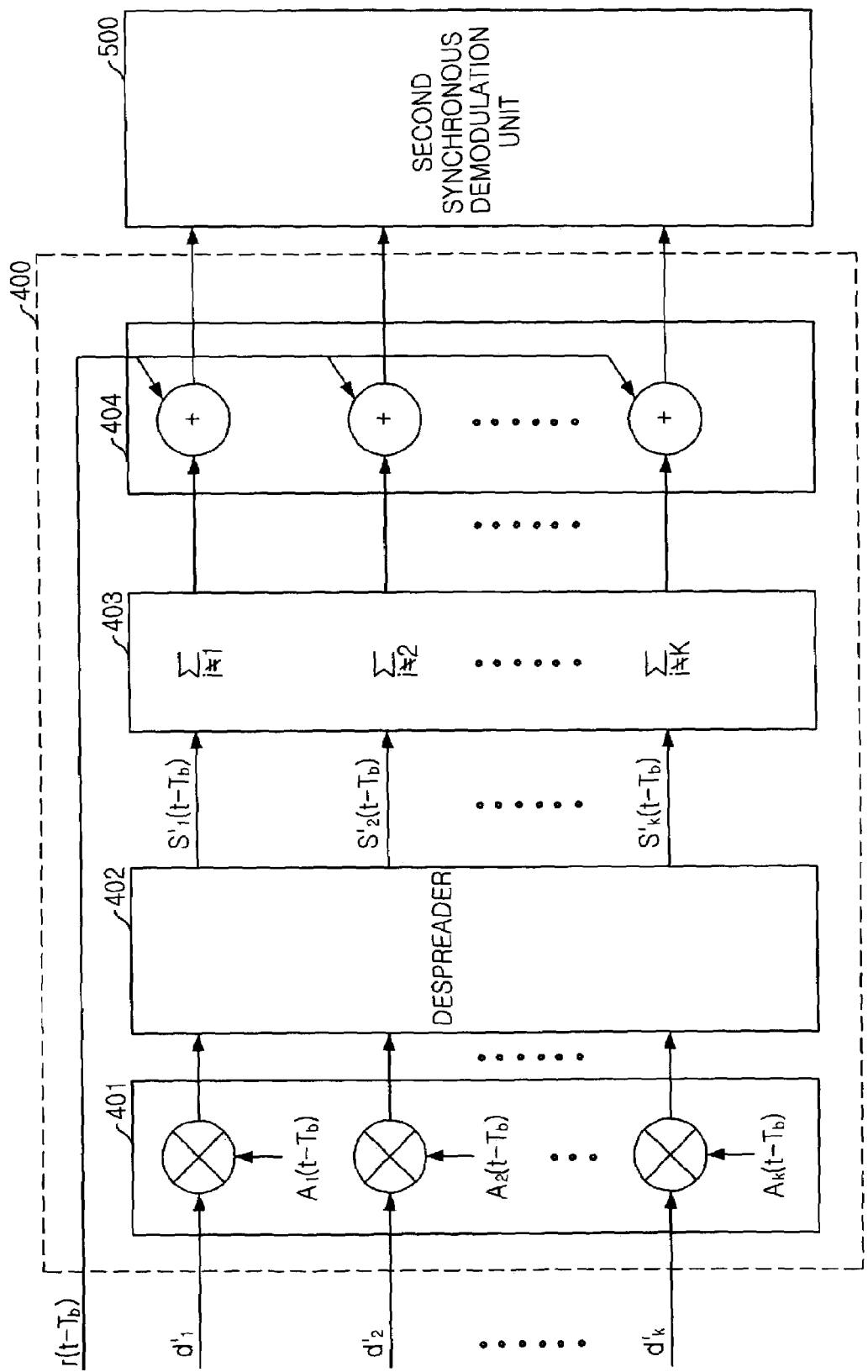

The above and other objects and features of the present invention will become apparent from the following description of the preferred embodiments given in conjunction with the accompanying drawings, in which:

FIG. 1 is a block diagram illustrating a synchronous demodulation apparatus of a base transceiver station in an Interim Standard-2000 (IS-2000) system in accordance with a preferred embodiment of the present invention; and FIG. 2 is a block diagram depicting an interference signal regeneration unit of FIG. 1.

DETAILED DESCRIPTION OF THE INVENTION

Other objects and aspects of the invention will become apparent from the following description of the embodiments with reference to the accompanying drawings, which is set forth hereinafter.

FIG. 1 is a block diagram illustrating a synchronous demodulation apparatus of a base transceiver station in an Interim Standard-2000 (IS-2000) system. Based on the preferred embodiment of the present invention, the synchronous demodulation apparatus of the base transceiver station in the IS-2000 system includes a first synchronous demodulation unit 100, a channel estimation unit 200, a received signal delay unit 300, an interference signal regeneration unit 400 and a second synchronous demodulation unit 500.

The first synchronous demodulation unit 100 receives a received signal r(t) and demodulates each user signal of 'k' numbers of mobile stations included in the received signal r(t) to output the demodulated signals to the interference signal regeneration unit 400.

The channel estimation unit 200 receives the received signal r(t) including traffic channel signals and pilot channel signals transmitted from the 'k' numbers of the mobile stations, and estimates channel parameters ($A_1(t-T_b)$, . . . , $A_k(t-T_b)$) designated for each of the mobile stations by using each pilot channel signal so as to output estimated signals to the interference signal regeneration unit 400. Each of the channel parameters ($A_1(t-T_b)$, . . . , $A_k(t-T_b)$) for the 'k' numbers of the mobile stations, which is outputted from the channel estimation unit 200, and includes an amplitude distortion $\alpha(\tau)$ and a phase distortion $\theta(\tau)$.

Meanwhile, the received signal delay unit 300 receives the received signal r(t), and delays the received signal r(t) in one symbol ($T_b$) to output a delayed signal to the interference signal regeneration unit 400.

Also, the interference signal regeneration unit 400 receives the user signals ($d'_1$, . . . , $d'_k$) of the 'k' numbers of the mobile stations from the first synchronous demodulation unit 100, and generates interference signals, each corresponding to 'k' numbers of subscribers. Then, when the received signal delay unit 300 applies the delayed signal $r(t-T_b)$, which is delayed by one symbol, to the interference signal regeneration unit 400, each interference signal is removed from the received signal $r(t-T_b)$, and 'k' numbers of the received signals ($r'_1(t-T_b)$, . . . , $r'_k(t-T_b)$) corresponding to the received signal with the removed interference signals is outputted to the second synchronous demodulation unit 500.

Referring to FIG. 2, the interference signal regeneration unit 400 includes 'k' numbers of multipliers 401, 'k' numbers of spreaders 402, 'k' numbers of adders 403 and 'k' numbers of subtractors 404.

The 'k' numbers of the multipliers 401 selects a user signal correctly corresponding to its order among the user signals ($d'_1$, . . . , $d'_k$) of the 'k' numbers of the mobile stations outputted from the first synchronous demodulation unit 100 and a channel parameter correctly corresponding to its order among the channel parameters ($A_1(t-T_b)$, . . . , $A_k(t-T_b)$) outputted from the channel estimation unit 200. After these selections, each of the multipliers 401 multiplies the selected user signal by the channel parameter to generate a phase distorted signal, which is outputted to a spreader 402 correctly corresponding to its order among the 'k' numbers of the spreaders 402.

The spreaders 402 regenerates 'k' numbers of mobile station transmitting signals ($s'_1(t-T_b)$, . . . , $S'_k(t-T_b)$) based on the phase distorted signal outputted from the multiplier 401 correctly corresponding to its order among the 'k' numbers of the multipliers 401, and output to the adders 403 correctly corresponding to its order among the 'k' numbers of the adders 403.

In the meantime, the adders 403 receives the above 'k' numbers of the transmitting signals ($s'_1(t-T_b)$, . . . , $S'_k(t-T_b)$) to perform summation operations excluding the transmitting signal that corresponds to an order of the adder 403, and generate each corresponding interference signal and output to the subtractor 404 correctly corresponding to its order among the 'k' numbers of the subtractors 404.

The 'k' numbers of the subtractor 404 simultaneously receives the received signal $r(t-T_b)$ from the received signal delay unit 300 and the interference signal from the adder 403 correctly corresponding to its order among the 'k' numbers of the adder 403. After these inputs, the interference signal is removed from the received signal $r(t-T_b)$ and outputs the result to the second synchronous demodulation unit 500.

Then, the second synchronous demodulation unit 500 receives 'k' numbers of the received signals ($r'_1(t-T_b)$, . . . , $r'_k(t-T_b)$) from the interference signal regeneration unit 400 and demodulates the received signals to output the demodulated signals to the base station controller 1.

In comparison with an asynchronous demodulation apparatus for an Interim Standard-2000 (IS-2000) system, by performing the embodiment in accordance with the present invention, it is possible for the synchronous demodulation apparatus for the IS-2000 system to improve a reception level about 3 dB and ultimately increase the number of subscribers.

While the present invention has been described with respect to certain preferred embodiments, it will be apparent to those skilled in the art that various changes and modifications may be made without departing from the scope of the invention as defined in the following claims.

What is claimed is:

1. A synchronous demodulation apparatus of a base transceiver station in a communication system, comprising:
   a first synchronous demodulation unit for receiving received signals each of which includes a pilot channel signal and a traffic channel signal, demodulating the received signals to generate demodulated signals, and outputting the demodulated user signals;
   a channel estimation unit for estimating channel parameters for each of the mobile stations based on the pilot channel signals transmitted from the mobile stations, and generating estimated channel parameters;
   a received signal delay unit for delaying the received signal and outputting a delayed signal which is delayed in one symbol from the received signal;
   an interference signal regeneration unit for generating interference signals based on the demodulated user signals and the estimated channel parameters, removing interference signals from the delayed signals, and outputting interference-cancelled-signals in which the interference signals are removed; and
   a second synchronous demodulation unit for demodulating the interference-cancelled-signals and outputting demodulated signals,
   wherein each of the channel parameters includes an amplitude distortion and a phase distortion.

2. The synchronous demodulation apparatus as recited in claim 1, wherein the interference signal regeneration unit includes:
   multipliers, each of which multiplies the demodulated user signal ($d'_1$, . . . , $d'_k$) by the channel parameter ($A_1(t-T_b)$, . . . , $A_k(t-T_b)$) so as to generate and output a phase distorted signal;
   despreaders, each of which despreads the phase distorted signal and generates a despread signal ($s'_1(t-T_b)$, . . . , $s'_k(t-T_b)$) based on the phase distorted signal;
   adders, each for adding the despread signals ($s'_1(t-T_b)$, . . . , $s'_k(t-T_b)$) except for the despread signal corresponding to its order so as to generate and output an interference signal; and
   subtractors, each each of which removes the interference signal from the delayed signal ($r(r-T_b)$) and outputs the interference-cancelled-signal to the second demodulation unit.

3. A synchronous demodulation method applied to a base transceiver station in a communication system, the method comprising the steps of:

a) receiving received signals each of which includes a pilot channel signal and a traffic channel signal, demodulating the received signals to generate demodulated signals, and outputting the demodulated user signals;

b) estimating channel parameters for each of the mobile stations based on the pilot channel signals transmitted from the mobile stations, and generating estimated channel parameters;

c) delaying the received signal and outputting a delayed signal which is delayed in one symbol from the received signal;

d) generating interference signals based on the demodulated user signals and the estimated channel parameters, removing interference signals from the delayed signals, and outputting interference-cancelled-signals in which the interference signals are removed; and e) demodulating the interference-cancelled-signals and outputting demodulated signals, wherein each of the channel parameters includes an amplitude distortion and a phase distortion.

* * * * *